May 9, 1967 C. L. FAUST ETAL 3,318,786
CHROMIUM PLATING
Original Filed Oct. 15, 1964

INVENTORS
CHARLES L. FAUST
GLENN R. SCHAER
JOHN G. BEACH

BY Dick M. Warburton Atty

INVENTORS
CHARLES L. FAUST
GLENN R. SCHAER
JOHN G. BEACH

May 9, 1967  C. L. FAUST ETAL  3,318,786
CHROMIUM PLATING
Original Filed Oct. 15, 1964  8 Sheets-Sheet 6

INVENTORS
CHARLES L. FAUST
GLENN R. SCHAER
JOHN G. BEACH
BY
Dick M. Warburton atty May 9, 1967    C. L. FAUST ETAL    3,318,786
CHROMIUM PLATING Original Filed Oct. 15, 1964    8 Sheets-Sheet 7

INVENTORS
CHARLES L. FAUST
BY  GLENN R. SCHAER
JOHN G. BEACH

Dick M. Warburton, atty

Fig. 17

United States Patent Office 3,318,786
Patented May 9, 1967

3,318,786
CHROMIUM PLATING
Charles L. Faust, Upper Arlington, and Glenn R. Schaer and John G. Beach, Columbus, Ohio, assignors to Diamond Alkali Company, Cleveland, Ohio, a corporation of Delaware
Continuation of application Ser. No. 404,250, Oct. 15, 1964. This application Nov. 5, 1965, Ser. No. 513,634
The portion of the term of the patent subsequent to July 3, 1979, has been disclaimed
4 Claims. (Cl. 204—51)

This application is a continuing application from application Ser. No. 404,250 filed Oct. 15, 1964, now abandoned, which in turn is a continuation-in-part of co-pending application Ser. No. 818,329, filed June 5, 1959, in the names of two of us and others, now U.S. Patent No. 3,232,854.

This invention relates to a process of electrolytically plating chromium on basis metals, and more particularly relates to an electrolytic chromium plating process for producing a chromium plate having low internal stresses, which is substantially free from cracks, and is highly corrosion-resistant, and still more particularly relates to electrolytically plating of chromium on basis metal in preparing low-stress decorative corrosion-resistant finishes for metal articles as well as for more heavily deposited, substantially stress-free, engineering applications such as, for example, load-bearing surfaces.

There are a number of criteria for measuring a satisfactory decorative finish in chromium plating, the first of which is that the plated surface must come from the plating bath with the typical bright "blue chromium" appearance, or, the plate must be capable of being easily buffed to produce a high luster; the second is that the plate must be adherent so as not to blister or flake off the base metal; and third, that the plate must be able to resist the corrosive effects of a highly corrosive environment such as salt water spray encountered near the ocean or the smoke and fumes encountered in proximity to heavy industry installations.

It has heretofore been the standard practice in the electrolytic chromium plating industry to use a direct current source, whether from a direct current generator, or a rectifier for alternating current, which approaches as nearly as possible the steady state condition obtainable with electric current from an electric battery of the dry or wet cell type. Such an electric current is commonly referred to in the plating industry as "ripple free," i.e., the variations in the current, when rectified alternating current, for example, 60 cycle, 50 cycle, or 25 cycle, is used as a source, are reduced to a minimum by the use of resistance and an impedance in the electrolytic plating circuit.

Attempts have been made from time to time to depart from this standard practice in the hope of improving quality of the chromium plate, by superimposing alternating current on direct current on the theory that chromium is deposited at the cathode through a mechanism involving chromium-carrying negative radicals in the vicinity of the cathode surface, and reasoning from this that periodic reversal of current, and making the plated surface anodic, would generate a much greater concentration of negative radicals in the immediate vicinity of the plated surface, so that when the normal current was restored there would be an adequate chromium supply available at the cathodic surface and ready for electrodeposition. One such proposal involving this theory can be found in U.S. Patent 1,918,865, E. M. Jones, July 18, 1933. In the process of this patent alternative ways of attempting to generate the negative radicals near the cathode surface are provided, one of which is to have a number of anode members surrounding the cathodic workpiece to be plated and then mechanically, by means of a multi-pole switch, applying the current to the anodes successively, and occasionally through a double-pole double-throw switch reversing the current. Another means taught by Jones for an equivalent of this technique is to superimpose alternating current on a direct current source in such a manner that one of the pulses is longer and stronger than the other. It can be seen immediately that by such an arrangement the current must fluctuate between the limits of the algebraic sum of the direct and alternating currents. With the alternating current the stronger, there must be a periodic reversal of direction of the current, which provides a constantly flowing current with one phase longer and stronger than the other, and after all this is what Jones was seeking to accomplish. But with the alternating current equal to the direct current the plating current would fluctuate between zero and twice the amplitude of the alternating current, and with the alternating current less intense than the direct current results in a fluctuating constant current, these conditions would be the equivalent of a highly "rippled" current in the first instance and approaching a "ripple free" current in the second. However, this technique has been shown to be ineffective in producing commercial satisfactory deposition of chromium, particularly in that if the plating current varies from zero to twice the amplitude of the alternating current, the workpiece being plated takes on the appearance of a surface on which chromium has been deposited under extraordinarily high current density conditions. On the other hand, if in superimposing the alternating current on the direct current the resultant is such that there is periodic current reversal, a dull deposit of chromium is obtained, or if the period of current reversal is significantly long little or no chromium will be deposited.

As recently as 1948 the theory was advanced that the progenitor for the chromium deposited from the chromic acid-containing plating bath, rather than simply chromium-carrying negative radicals, was in all likelihood an alloy of atomic hydrogen with chromium, hereinafter designated $CrH_x$ which was deposited by the electric current at the cathode, and that at some subsequent time decomposed to evolve molecular hydrogen and deposit metallic chromium.

Also, it has been recognized in the art of electrolytic chromium plating that, when chromium is plated on a basis metal from a chromic-acid-containing plating bath, the deposited metal is internally stressed, either tensile or compressive. Excessively high stresses in the electrodeposited chromium may cause peeling, blistering (the chromium plate separates from the basis metal without visible fracturing), or cracking of the deposit, thereby rendering the basis metal much more susceptible to corrosion upon exposure to an environment in which oxidation-reduction reactions can take place.

During the ordinary or conventional process of electrodepositing chromium from a chromic acid-containing plating bath, the stress in the metal is high initially, i.e., of the order of 2 to $5 \times 10^5$ pounds per square inch (p.s.i.), and as the electrodepositing process proceeds and the thickness of the chromium plate increases, the tensile stress ordinarily decreases exponentially and approaches a nearly constant value after the thickness reaches several tenths of a mil, i.e., 2 to $5 \times 10^{-4}$ inch (5 to $12 \times 10^{-3}$ mm.). However, it is the internal stresses set up in the metal deposited in the early stages of the electrodepositing process, i.e., up to about $100 \times 10^{-6}$ inch in thickness, which are of most importance to good adherence of the plate to the basis metal, as well as the fate of the plate in its end uses, not only in terms of corrosion-resistance, but also in terms of engineering uses involving load bearing surfaces and frictional forces.

Based on the theory of the formation of the chromium-hydrogen alloy, $CrH_x$, electrodeposited in the plating operation as the progenitor of the chromium metal plate, it can be reasoned that the high stresses involved where "ripple free" current is employed would be expected to develop as layer upon layer of the $CrH_x$ is laid down in the electroplating process, and the escape of hydrogen would be either inhibited or prevented. It can also be reasoned that these factors could account for the highly cracked and highly stressed chromium plate customarily encountered with "ripple free" current under ordinary chromium plating conditions of concentration of the chromic acid in the plating bath, temperature, and current density.

Accordingly, it is an object of the present invention to provide a process for the electrodeposition of chromium on a basis metal in such a manner as to minimize internal stresses set up in the course of the electrolytic process.

Another object of the invention is to provide a process for the electrodeposition of chromium whereby the chromium is laid down as a soft, strongly adherent low-stressed, substantially crack-free, coating consisting essentially in a columnar arrangement of body-centered cubic crystals.

These and other objects of the invention will be apparent to those skilled in the art from the description which follows, in conjunction with the drawings attached hereto and made a part hereof, in which.

Figure 12:
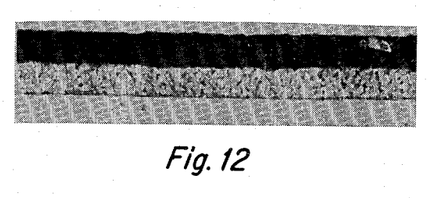
FIG. 12 is a photomicrograph of a cross-section of a chromium plated spiral taken from the contractometer of FIG. 9, with cyclically varying unidirectional current from a single-phase full-wave rectifier to provide in each cycle of 8.33 milliseconds, 1.25 milliseconds during which no plating current ($t_{nc}$) is flowing.
Figure 13:
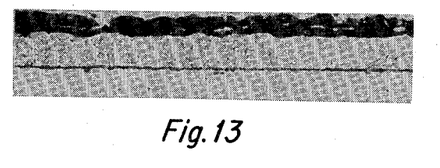
FIG. 13 is a photomicrograph of a cross-section of a chromium plated spiral from the contractometer of FIG. 9, with cyclically varying unidirectional current from a single-phase full-wave rectifier to provide in each cycle of 8.33 milliseconds, a period of 1.83 milliseconds during which no plating current ($t_{nc}$) flows.
Figure 14:
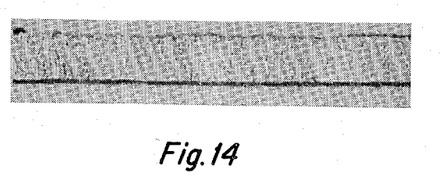
FIG. 14 is a photomicrograph of a cross-section of a chromium plated spiral from the contractometer of FIG. 9, with cyclically varying unidirectional current from a single-phase full-wave rectifier to provide in each cycle of 8.33 milliseconds a period of 1.67 milliseconds during which no plating current ($t_{nc}$) flows.
Figure 15:
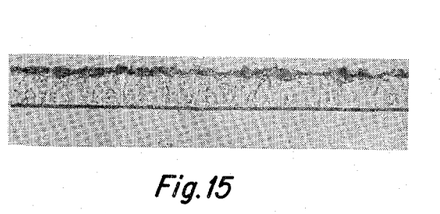
FIG. 15 is a photomicrograph of a cross-section of a chromium plated spiral from the contractometer of FIG. 9, with cyclically varying unidirectional current from a single-phase full-wave rectifier to provide in each cycle of 8.33 milliseconds, 2.42 milliseconds during which no plating current ($t_{nc}$) flows.

The plating baths used for plating the helices from which the photomicrographs of FIGS. 12, 13 and 15 are obtained, contain chromic acid and sulfate in the ratio of 100:1, and colloidal silica in the amount of 1.5 g./1. The plating bath used for plating the helix from which the photomicrograph of FIG. 14 is obtained is the so-called "conventional" bath containing chromic acid and sulfate in the ratio of 100:1 without other additives.

Figure 16:
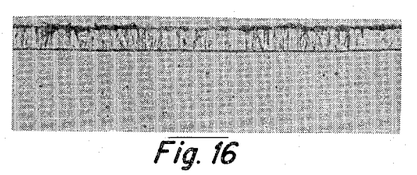
FIGS. 16 and 16a are photomicrographs of cross-sections of chromium plated spirals from the contractometer of FIG. 9, the current flowing continuously during the plating operation, i.e., there is no cycle variation of the plating current.
Figure 16A:
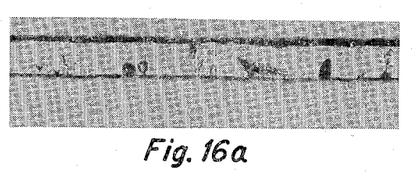

The characteristics columnar deposit of chromium metal obtained by the process of the present invention is evident in FIGS. 12–15, inclusive, and especially when contrasted with the deposits shown in FIGS. 16 and 16a, in which the plating current flows continuously, the photomicrographs in FIGS. 16 and 16a evidencing the usual occlusions and cracks. In this regard, reference may be had to "Modern Electroplating," edited by Allen Gray, published by John Wiley and Sons (1953), page 180, of chapter 6, Fig. 3.

All of the photomicrographs for FIGS. 12–16a, inclusive, were taken from specimens having a plate thickness of about 1.5 mil, and were made at a magnification of 1000 diameters using the customary techniques for metallurgical microscopic examination and mounting of the metallurgical specimens. In each of the photomicrographs the basis metal appears at the bottom, the deposited chromium plate immediately thereabove.

The process of the present invention broadly comprises steps of first preparing the surface of the basis metal so that it is receptive to the chromium plate and thereafter plating the basis metal in a chromic acid-containing plating bath with a cyclically varying unidirectional voltage, having within each cycle of the voltage variations a period ($t_1$) of current density of sufficient magnitude and duration to deposit $CrH_x$, the maximum time ($t$) of said period being controlled so as to be less than that prescribed by the equation:

$$t = \frac{(1.2 \times 10^{16})(6) \times \frac{(9.65 \times 10^4)}{(6.06 \times 10^{23})}}{(CD) \times (CE)}$$

where CD is current density, and CE is current efficiency, and a shorter succeeding finite period of time ($t_2$) in which the current is reduced at least to the point at which depositing of $CrH_x$ ceases and decomposition of $CrH_x$ takes place with the coincident deposition of chromium metal, the duration of said succeeding period being insufficient to allow substantial diffusion from the bulk of said solution to the cathode surface.

The important consideration is that, during each cycle of the current, there must be a finite period during which substantially no electrodeposition occurs at the cathode. If, during this period, a current flows which is of insufficient density to permit electrodeposition at the cathode, the requirements as to the period of "no electrodeposition," or no plating current ($t_{nc}$) are satisfied.

This aspect of the invention may be attained through the use of several different power sources. One such power source, suitable for low amperage plating with cyclically varying unidirectional current, using 60-cycle single-phase input, comprises a transformer and a single-phase, full-wave rectifier which, when properly controlled in conjunction with a plating circuit, will provide the appropriate period during each cycle in which there is no deposition of chromium. This period is attained when the voltage applied to the plating bath falls below approximately 1.8 volts and the current produced by the electrolytic or cell voltage of the plating bath plus the electrodes therein is prevented from flowing out of the system, in this specific instance, by the rectifier, at the end of each half-wave. There is, therefore, in this period a current of insufficient density to plate chromium.

Current form

The cyclically varying current form used is of critical importance to the obtaining of a satisfactory chromium plate in accordance with the present invention, and in this regard it is to be understood that the finite periods referred to, for current flow and when no current flows are dependent on the rates of reactions taking place at the cathodic surface and immediately adjacent the cathode, and further, that such periods are conveniently stated in terms of milliseconds ($10^{-3}$ sec.). The current must be unidirectional and come to and remain at zero during each cycle for a finite period of time which is less than the period during which deposition of the $CrH_x$ takes place, and during which decomposition of $CrH_x$ and evolution of molecular hydrogen occur. This period, however, should not be so extended as to permit substantially complete diffusion of the components of the bulk of the plating bath into the cathode film, i.e., that portion immediately adjacent the cathodic surface which is changed in composition by virtue of the electrolytic process taking place.

Figure 1:
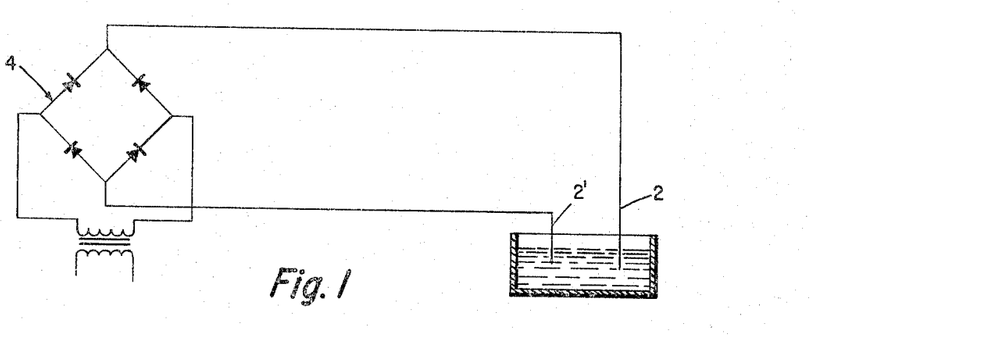
FIG. 1 is a circuit diagram of a power supply for providing the cyclically varying unidirectional current wave form for the plating of chromium on a basis metal in accordance with the present invention.

One method of obtaining the desired current form is to use the power supply illustrated in FIG. 1, which is essentially a full-wave rectified, single-phase current. The power supply is obtained from a single-phase, 60-cycle alternating current. The anode may be a lead alloy as is usually employed or other metals such as platinum may be used. The rectified voltage across the plating bath electrodes 2—2' has the form illustrated in FIG. 2. It can be seen from this figure that the voltage never reaches zero across the electrodes, rather the voltage drops to about 1.8 volts. The reason for this phenomenon is believed to lie in the fact that the plating bath and electrodes form an electrolytic battery having a 1.8 volt E.M.F. opposed to the applied electroplating voltage.

Figure 2:
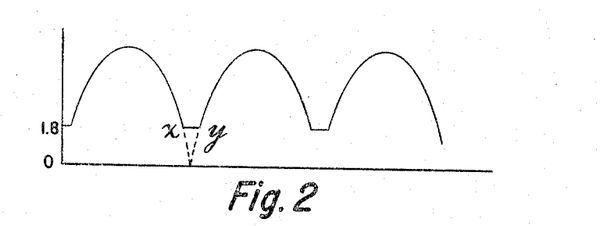
FIG. 2 is a diagrammatic representation of the voltage wave of the cyclically varying unidirectional current wave form of the present invention, at the electrodes in the plating bath of FIG. 1.
Figure 3:
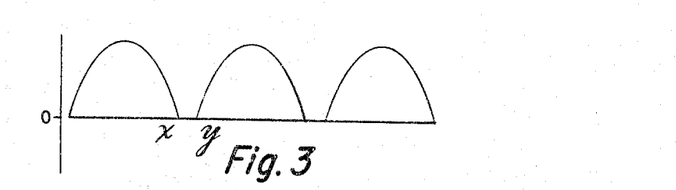
FIG. 3 is a diagrammatic representation of the current wave form resulting from the power supply of FIG. 1.

The current form corresponding to the voltage wave of FIG. 2 is illustrated in FIG. 3. During the time that the applied voltage is above 1.8 volts, plating current flows, but when the applied voltage drops to 1.8 volts, the voltage at the electrodes cannot drop any further because of the opposing voltage developed by the battery formed by the electrodes and plating solution. Even though the applied voltage from rectifier 4 drops to zero, the 1.8 battery voltage will not cause any current to flow in view of the fact that the rectifier 4 blocks such current flow. Thus, during the period of time when the supply voltage drops from 1.8 volts to zero and then rises to 1.8 volts, there is no current flow across the electrodes.

Figure 4:
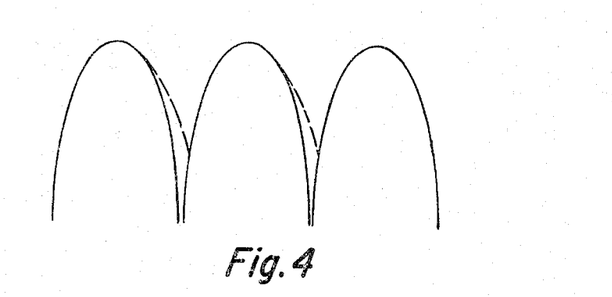
FIG. 4 is a diagrammatic representation of a current wave form resulting from imposing a high amplitude current in the circuit diagram of FIG. 1.

The power supply of FIG. 1 provides excellent results for a low total amperage output, that is, an output of up to approximately 1000 amps. Above 1000 amps, however, two ancillary factors become involved which are believed to result in poor plates due to the elimination of the current going to zero. These effects are illustrated by the curves of FIG. 4. The solid line curve is a pure sine wave curve of high amplitude. It is seen that because of the high amplitude of the voltage, the period during which the applied voltage is below 1.8 approaches zero. In addition to this the condition caused by inductance of the circuit, which is practically impossible to eliminate, decreases the slope of the descending side of the current wave as illustrated in the broken lines. The two effects, high amplitude and induction, cause the current waves to merge above the zero current point so that there is no period of zero current flow during each current cycle, resulting in poor quality of the chromium plate deposited under such conditions.

Figure 5:
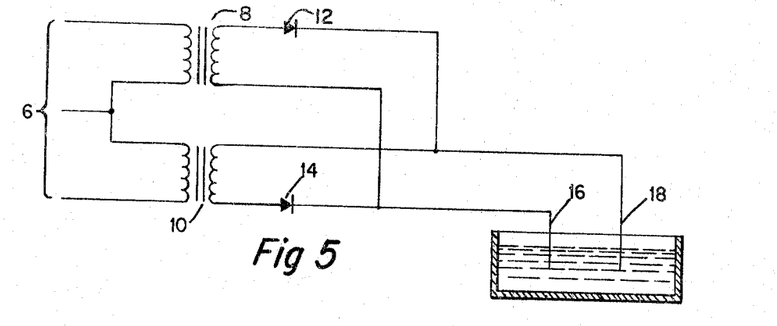
FIG. 5 is a circuit diagram of another power supply furnishing cyclically varying unidirectional current wave form employed in the process of the present invention, in which a three-phase half-wave rectified voltage is used.
Figure 7:
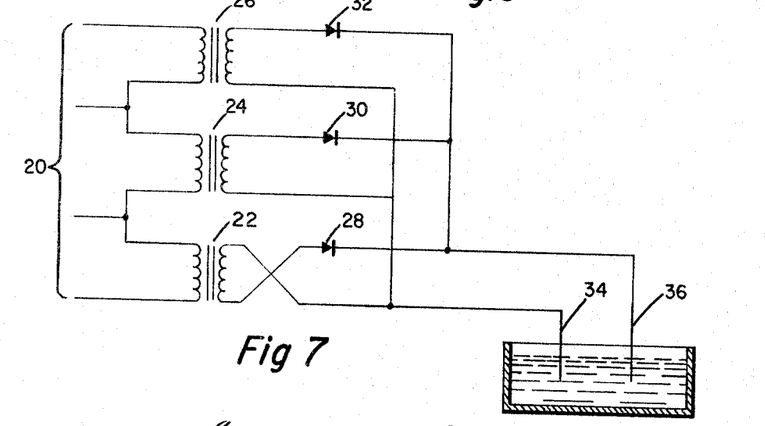
FIG. 7 is a circuit diagram for supplying the cyclically varying unidirectional current required for the process of the present invention, supplying a three-phase half-wave rectified current with one phase reversed.

Alternative forms of power supply which provide good plating results are as shown in FIGS. 5 and 7 and are described in U.S. Patent 3,111,479 and Patent 3,042,592.

In FIG. 5, two phases of a three-phase system are connected across the plating bath electrodes through a half-wave rectification system. The voltage source indicated at 6 is connected in Y through step-down transformers indicated at 8 and 10. The windings of the transformer 8 may be tapped so that the phase of the current wave from that transformer can be shifted with respect to the current wave from transformer 10. The current is supplied by a half-wave rectification system having rectifiers 12 and 14 and then applied to the anode 16 and cathode 18 of the plating circuit.

Figure 6:
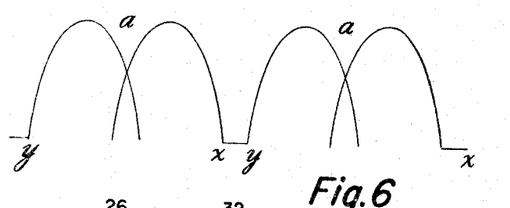
FIG. 6 is a diagrammatic representation of the current wave form of the power supply of FIG. 5.

The current wave form resulting from this connection is as shown in FIG. 6. It will be seen that the current flow period $yax$ occupies about 300° and the time $xy$ of no current flow occupies about 60°. This period of no current flow can be varied by changing the tap on transformer 8 to provide optimum results. Also, inductance effects will tend to decrease the period of no current flowing, but inductance effects with this arrangement will not be sufficient to reduce the period of no current flowing to anything approaching zero, and with 60-cycle current the period when no current is flowing will be somewhat less than 2.5 milliseconds.

While the circuit of FIG. 5 provides satisfactory plating results, as a practical matter, it may be disadvantageous when heavy plating currents are used which tend to unbalance the applied three-phase voltages in the circuits surrounding the plating installation.

Figure 8:
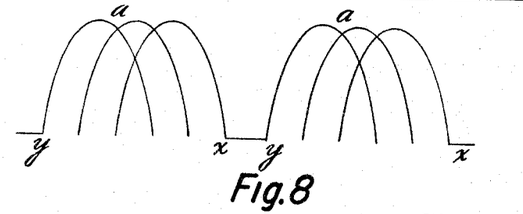
FIG. 8 is a diagrammatic showing of the current wave form of the power supply of FIG. 7.

The power supply diagrammatically illustrated in FIG. 7 has a three-phase voltage input indicated at 20 going into three Y connected transformers 22, 24 and 26. The windings of the transformer 26 may be tapped in order to shift the phase of the current of that leg in a manner similar to that explained with reference to FIG. 5. The secondary of the transformer 24 is reversed as compared to the transformer of FIG. 5 so as to produce a 180° phase shift of the current. All three transformers are connected through rectifiers 28, 30 and 32 to the anode 34 and cathode 36 in the plating bath. The current form resulting from the power supply as connected in FIG. 7 is shown in FIG. 8. The remaining two phases are identical to the phases shown in FIG. 6.

It will be appreciated from FIG. 8 that the period *yax* and the period *xy* in the three-phase connection of FIG. 7 are of the same duration as the corresponding periods in the two-phase connection of FIG. 5. However, because of the introduction of the third phase, the load on each of the three phases is substantially in balance and the root mean square current of FIG. 8 will be substantially greater than the root mean square current of FIG. 5 for the same amplitude of applied voltage. It will be understood that either a Y or delta connection of the transformers will provide satisfactory results, and that which of such connections are to be used is merely a matter of choice.

When the plating voltage is applied using the current form having a finite period in which current flows, and a finite period in each cycle in which no current flows, superior results are attained. These results are illustrated by reference to FIGS. 12, 13, 14 and 15.

As noted hereinabove, FIGS. 12–15 are photomicrographs of cross-sections magnified 1000 times, of 1.5 mil thick chromium plate applied with a single-phase, full-wave rectifier. This figure illustrates the columnar structure of the chromium which is plated in accordance with the present invention. It should be observed that the chromium is substantially free from any foreign inclusion.

FIG. 16 is a cross-section magnified 1000 times showing chromium plated by conventional processes. Note particularly the inclusion of foreign matter or cracks, these imperfections being eliminated by plating in accordance with the present invention.

The precise mechanism by which the current form of the invention provides outstanding results is not known, but the following explanation is submitted as one which is believed to be the most reasonable explanation commensurate with the observations made and test results obtained.

FIG. 2 shows a wave form of full-wave rectified 60-cycle voltage (vertical axis) versus time (horizontal axis) that is typical of the requirements of this invention. The essential features of this wave form, which constitute an important part of this discovery, are:

(a) There must be a finite time *xy* during which no current flows and the voltage remains practically constant at about 1.8 volts or at the voltage caused by the "battery effect" at the two electrodes immersed in the plating bath, (b) The duration of *xy* must be greater than the minimum time for the decomposition of deposited $CrH_x$ but less than the maximum time which would permit diffusion of ions from the bulk of the plating bath to the cathode surface.

(c) The duration of the period during which $CrH_x$ is deposited must be substantially greater than zero so that appreciable $CrH_x$ is deposited, but not so extended that multilayering of deposited $CrH_x$ results.

The published literature supports the view that, in properties, atomic hydrogen is metallic in behavior and does not have the properties of a gas, and the process of the present invention is based on the concepts (1) that hexagonal chromium-hydrogen alloy (chromium metal is body centered cubic) is electrodeposited as the progenitor of chromium metal, at the cathode in chromic acid electrolytes, (2) that the chromium-hydrogen alloy is thermally unstable and may decompose either during or after its electrodeposition, and (3) that when the rates of electrodeposition and decomposition of the chromium-hydrogen alloy are properly controlled, the chromium plate is of low tensile stress and substantially crack-free.

The composition of the chromium-hydrogen alloy is not critical for purpose of explaining the process, and the alloy will be referred to hereinafter as $CrH_x$, a "unit" of which is electrodeposited by electrolytic reduction of Cr and H ions in the same sense as a metal "atom" is electrodeposited. Thus, when reference is made to electrodeposition of a $CrH_x$ unit, it is analogous to the practice in the electroplating art of referring to electrodepositing one atom, and the $CrH_x$ unit deposits at a situs on the surface according to surface energy relationships as would a metal atom deposit.

The four reactions proposed to explain this discovery are as follows:

*Reaction 1.*—During the period in which the current density is sufficient to deposit $CrH_x$, $Cr^{+6}$-containing complex ions are reduced and chromium is co-deposited with hydrogen to form the units of unstable hexagonal chromium-hydrogen alloy, referred to as $CrH_x$.

*Reaction 2.*—During this period of current flow, $CrH_x$ deposition is accompanied by copious evolution of hydrogen gas (molecular form of hydrogen) the result of which is a rise in pH of the plating solution immediately adjacent to and in contact with the cathode surface, referred to as the cathode film.

*Reaction 3.*—During the period in which no current flows, $CrH_x$ units decompose into chromium and hydrogen atoms, the chromium atoms taking a position in the structure of body-centered cubic chromium metal crystals, and the hyrdogen atoms combine to form molecular gaseous hydrogen which escapes. Any $CrH_x$ unit that is completely covered by $CrH_x$ and thus not in contact with plating bath, also decomposes, but at some later time, to body-centered cubic chromium and molecular hydrogen which cannot escape and remains occluded to cause tensile stress.

*Reaction 4.*—During the period in which no current flows, diffusion into the solution interface at the cathode surface tends to restore the pH to the value of that of the bulk of the plating bath.

According to the above reactions, and in particular, Reaction 3, when $CrH_x$ units build on top of other undecomposed $CrH_x$ units, the basis is laid for cracked, highly stressed and hard chromium plate of the prior art processes. Thus, by controlling the electrodeposition rate relative to the decomposition rate of chromium-hydrogen alloy, soft, crack-free and unusually protective chromium plate is attained.

The rates of Reactions 1 and 2 are directly proportional to current density and current efficiency. Current efficiency, in turn, is controlled by temperature, bath composition, current density and other variables well known in the art of chromium plating. The rates of Reactions 3 and 4 are controlled by temperature and bath composition. Accordingly, the maximum length of the period during which the current density is sufficient to deposit $CrH_x$ units will be determined by Reaction 1 and the maximum and minimum of the period during which no current flows will be determined by Reactions 3 and 4.

By the process of the present invention, plating of chromium on a basis metal surface is initiated as the cyclically varying current is applied when the applied voltage exceeds about 1.8 volts. Evolution of molecular hydrogen is the first reaction which takes away hydrogen ions from the cathode film and raises the pH of the interface layer. $CrH_x$ deposits when sufficient current density is attained, and the rate of $CrH_x$ deposition is proportional to the product of current density (CD) and current efficiency (CE), in accordance with the equation:

Eq. (1)

$$\frac{\text{total atoms } CrH_x \text{ deposited}}{\text{in.}^2 \text{ sec.}} = k_1 \times CD \times CE$$

where $k_1$ is a proportionality constant $$= \left( \frac{\text{number of deposited CrH}_x \text{ atoms}}{\text{amp sec.}} \right)$$

However, the CrH$_x$ atoms depositing are equally likely to deposit on any point of the cathodic surface so that before CrH$_x$ has covered the entire bare surface, some CrH$_x$ alloy will be deposited on the first CrH$_x$. The rate at which CrH$_x$ will cover freshly deposited CrH$_x$ is proportional to the fraction of the total surface covered by CrH$_x$. Thus, if $\theta$ is the fraction covered at any instant, then Eq. (2) $\quad \dfrac{\text{atoms CrH}_x \text{ covered}}{\text{in.}^2 \text{ sec.}} = k_1 \times CD \times CE \times \theta$ But $\theta$ is changing as deposition continues in proportion to the product of $CD \times CE \times$ time $(t)$ x fraction of total surface that is uncovered, $(1-\theta)$.

Eq. (3) $\quad \dfrac{d\theta}{dt} = k_3 \times CD \times CE \times t \times (1-\theta)$ or Eq. (4) $\quad \dfrac{d\theta}{(1-\theta)} = (k_3 \times CD \times CE) \times t \, dt$ When the fraction of the surface covered by CrH$_x$ is small (say less than 0.1), then $\theta \ll 1$, and Eq. (5) $\quad \theta = \dfrac{k_3}{2} \times CD \times CE \times t^2$ Substituting Eq. (5) into Eq. (2), we have:

Eq. (6)

$\dfrac{\text{atoms CrH}_x \text{ covered}}{\text{in.}^2 \text{ sec.}} = \dfrac{dn}{dt} = \dfrac{k_4}{2} \times (CD)^2 \times (CE)^2 \times t^2$ where $n$ is the amount of CrH$_x$ covered per square inch of cathodic surface. Integrating Eq. (6), we have:

(Eq. 7)

$n = \dfrac{\text{atoms CrH}_x \text{ covered}}{\text{in.}^2} = \dfrac{k_5}{3} \times (CD)^2 \times (CE)^2 \times t^3$ Eq. (7) symbolizes several practical points:

Note that $n$ increases with the cube of the time $(t)$ during which CrH$_x$ is depositing. Thus, for any given CD and CE, an increase in the current pulse $(t)$ of twice the duration will have eight times the amount of covered CrH$_x$ atoms. Similarly, a decrease of $(t)$ by 10% reduces $n$ by 30% (28.1%).

Note also that $n$ increases in proportion to the square of the product of $CD \times CE$. Since CE generally increases with increasing CD, this relationship means that the most CrH$_x$ alloy will be expected to deposit in the high CD areas, and always by more than what CD alone would indicate.

Eq. (7) further shows that the higher the CD and CE, the shorter the time of the plating pulse should be.

It has been found that the maximum period of $(t)$ for the plating pulse of the cycle, to obtain a desirable chromium plate can be derived from Eq. (1), in that the product of $k_1 \times CD \times CE \times t$ must be less than the total amount of CrH$_x$ required to cover one square inch of cathode surface. Less than 50% coverage is preferred and for this calculation, $$k_1 = \dfrac{1(\text{CrH}_x \text{ unit})}{6 \times 1.6 \times 10^{-19} \text{ amp. sec.}}$$

CD is the maximum average CD at any point on the plated object during the plating pulse, CE is that associated with the maximum average CD during the plating pulse, and considering about $1.2 \times 10^{16}$ units of CrH$_x$ to cover one sq. in. As an example, when the overall average CD is 1.5 amps/in.$^2$, the maximum average CD during the plating pulse, at an edge of a flat panel may be 5.0 amps./in.$^2$. At this high CD edge the CE is approximately 0.2, whereas in a low CD area the CE may be as low as 0.1. The maximum average CD during the plating pulse is limited by the high CD area as calculated with Eq. (1)

$5.0 \text{ amps./in.}^2 \times 0.2 \, (CE) \times \dfrac{1 \text{ unit CrH}_x}{6 \times 1.6 \times 10^{-19} \text{ amp. sec.}}$ $\times \text{time} = 1.2 \times 10^{16} \, \dfrac{\text{units CrH}_x}{\text{in.}^2}$ Maximum time of the plating pulse to deposit a monatomic layer of CrH$_x$ is 11.5 milliseconds, and the preferred plating pulse would be less than half this value.

The above definitions of average CDs differ from the average CD observed with an ammeter. Conventional D.-C. voltmeters or ammeters indicate by the movement of a relatively heavy needle. These meters purposely are built to show a steady average reading even though the values of voltage or current may be fluctuating rapidly over wide limits, as with rectified current. Thus, if rectified current were flowing about 90% of the time, the average CD during a plating pulse equals the average CD read on a meter divided by 0.9. If such current were flowing only 50% of the time, i.e., half-wave rectified, the average CD during a plating pulse would be twice that of the average CD read on a meter. Thus, in the use of Eq. (1), as illustrated above, average CD during the plating pulse is equal to:

$$\dfrac{CD \text{ (from ammeter reading)} \times (\text{time current flows} + \text{time no current no current flows})}{\text{time current flows}}$$

Note that a change in the time current flows is cancelled by a change in the value of CD so that the product is the same. However, according to Eq. (7), the number of occluded CrH$_x$ units varies more with the plating pulse time than with CD, so that quality of the final plate is best controlled with the proper definitions of CD, CE and plating pulse time given above.

Maximum plating time is now designated as the time needed to deposit less than enough CrH$_x$ units to cover the surface being plated. Therefore, the shape of the curve $yax$ in FIGS. 6 and 8 is not too important. That is, it may be pure sine-wave, distorted sine-wave, square-wave, superimposed sine-waves or any other shape. The important point is that for any selected CD the duration of the plating pulse time, $yax$ should not exceed that necessary to lay down one complete monolayer of CrH$_x$ units, with the preferred plating pulse time being within the range of 5% to 50% of that needed to give theoretical coverage as defined by Eq. (1), and with commercially available rectifiers appropriately adapted to give a cyclically varying unidirectional current wave form, plating pulse times within the range of 5% to 35% of such period have given excellent results in terms of low tensile stresses.

These maximum or preferred plating pulse time values vary with temperature but the relationship is not completely known. Maximum plating pulse time will decrease with decreasing temperature of the plating bath during the plating operation. However, the above definitions have been found to be valid over the normally useful chromium plating temperatures.

An important part of the present invention is that there must be a finite period of time during which plating current does not flow, as represented by $xy$ in FIGS. 3, 6, and 8 to obtain a satisfactory low tensile stress chromium plate, such period being less than the plating pulse time. Evidently the surface units of CrH$_x$ will not readily decompose (Reaction 3) so long as the applied voltage provides a current density sufficient to deposit CrH$_x$, and if the CrH$_x$ is not allowed to decompose, it is covered with additional CrH$_x$ during the continuance of the current flow. These occlusions add stress to the plate which will either pull the plate away from the basis metal, or, if enough $CrH_x$ units are occluded, the chromium plate itself will crack, because the $CrH_x$ is unstable at temperatures above 32° F. and decomposes with a contraction in volume.

As noted previously, two reactions occur during the portion of the cycle when no current flows. Reaction 3 is the $CrH_x$ decomposition, and Reaction 4 involves the change in pH in the cathode-plating bath interface. It has been discovered that the minimum time during which no current flows in the cycle is that necessary to allow the substantial completion of Reaction 3 before more of the chromium-hydrogen atoms are deposited. The maximum time during which no current flows is that which would allow appreciable completion of Reaction 4. The rates of both Reactions 3 and 4 increase with increasing temperature, but the ratio of rates is approximately temperature-independent. Therefore, the absolute values of maximum and minimum times during which no current flows change with temperature, but the ratio of maximum to minimum does not change much. It has been found that the rate of Reaction 3 is about 5 times as fast as the rate of Reaction 4, and that Reaction 3 requires a minimum of about 0.5 millisecond when the temperature is about 150° F. in a bath containing about 150 g./l. of $CrO_3$. Under these conditions then, minimum for the period when no current flows is about 0.5 millisecond and the maximum for such period is about 2.5 milliseconds using single-phase full-wave rectified 60-cycle alternating current, the plating pulse varying from 8.25 milliseconds to 5.83 milliseconds.

The rate of Reaction 3 is practically independent of $CrO_3$ concentration whereas the rate of Reaction 4 increases about in proportion to the $CrO_3$ concentration. Thus, in the above example, when the $CrO_3$ concentration is doubled, the minimum period during which no current flows remains at about 0.5 millisecond. Control of the duration of the period in which no current flows becomes more critical as the $CrO_3$ concentration increases because of the rate of Reaction 4.

Having described the necessity for and function of the periods in the cycle of current variation, the following conclusions will be apparent:

(1) Minimum time of the plating pulse is desirable for the best low-stress chromium plate.

(2) Maximum time of the plating pulse is commercially desirable for the fastest plating rate in a production line.

(3) Minimum time during which no current flows is desirable to keep Reaction 4 to a minimum, thus yielding a better current efficiency, and in commercial operations to increase the plating rate in a production line.

(4) Maximum time during which no current flows is desirable to assure the completion of Reaction 3 and to minimize the effects of stray inductances in the external circuit that tend to keep current flowing.

(5) As low a $CrO_3$ concentration as practical is desirable because this makes the duration of the time during which no current flows less critical in control and improves overall CE so that low CDs or faster plating rates may be attained.

(6) As high a CD as possible should be used as this generally improves CE and increases the overall plating rate.

Notice that some of these conclusions appear to be contradictory to one another. Prior to the discoveries of this invention, they were contradictory, and reproducibility and reliability of results could not be predicted. Now, because of the discoveries in the present invention, a dependable commercial process can be controlled.

It has also been found that with appropriately modified rectifiers providing single-phase full-wave rectified current, the flat voltage region $xy$ in FIG. 2 disappears when the plating current exceeds a few hundred amperes. This condition (since there is no period during which current is not flowing) prevents obtaining the desired and novel chromium plate of the present invention, and has been traced to inductance effects externally of the plating circuit. At high amperages the inductive reactance in what is actually a fluctuating direct current, because of its natural effect to oppose a change in current strength, sometimes distorts the voltage wave so that the descending voltage does not reach about 1.8 volts before the ascending effect again increases to peak value. The result is that there is continuous current flow with no period for the surface changes to take place in the electrodeposition film as heretofore described, and the deposition mechanism for soft, crack-free chromium plate does not occur. This inductive reactance has been found generally to be the cause for the inability to get good chromium plates on production scale operation with single-phase, full-wave rectifiers whereas success is achieved in the method of the present invention for the reasons set forth above.

It is essential to this invention that there be provided a cyclically varying unidirectional direct current voltage supplied and controlled so that the chromium surface remains negative and that a period of no current flow be provided, that the parts being chromium plated not be reversed in potential sign, but always be cathodic (or negative) so the cathode-film situation can exist as described in conjunction with FIG. 2, and that there be no current flowing during the period $xy$ of FIGS. 2, 3, 6, and 8.

In order that those skilled in the art may better understand the present invention and in what manner the same may be carried into effect, the following specific examples are offered:

*Example 1.—"Contractometer" stress measurements*

(For description of theory and principles involved see also Brenner & Senderoff, American Electroplaters' Society Proceeding, 1948, pp. 53–75.) A diagrammatic showing of the apparatus employed is shown isometrically, in partially exploded form in FIG. 9.

The chromium metal deposit is formed on a basis metal that has been shaped into a helix, and the relief of the stress by expansion or contraction effects a change in the radius of curvature of the helix. "Compressive stress" is relieved by contraction of the helix. In the spiral contractometer the change in the radius of curvature of the helix is measured by the angular displacement of one end of the helix while the other end is held rigid. The angular displacement is magnified by the use of a gear train and is read directly from the instrument dial calibrated in degrees of arc.

The helices used for these measurements are of #302 stainless steel, and when compressed longitudinally (closing the space between the turns of the coil without overlap) they have a height of 6 inches, a pitch (width) of 0.787 inch and a thickness of 0.010 inch.

Before mounting the helix on the contractometer the following steps are taken. First, the helix is rinsed with acetone and wiped dry, rinsed again in acetone and allowed to air dry, then weighed to the nearest 0.1 mg.

The outside surface of the helix is completely covered with masking tape, using two overlapping strips of ½ inch pressure-sensitive electroplaters' tape. The helix is next completely immersed in a hot (220°–240° F.) bath of platers' "stop-off" wax, removed from the bath very slowly to produce the desired thin wax coating and then dipped in cold water to set the wax. The tape is removed with extreme care to prevent cracking of the wax coat. The outer surface is inspected to insure that it is completely free of wax.

The helix is then carefully mounted on the shaft of the contractometer by securing the helix with the top clamp which holds it rigid and furnishes the necessary electrical contact. If the helix is now compressed longitudinally (without overlapping of the turns of the coil) and the top of the bottom clamp, which furnishes contact with the torque rod, is attached 4.5 inches below the bottom of the top clamp, a plating area of 11.92 square inches will be obtained. While maintaining the position of the clamp on the helix, the helix is allowed to expand to a position where the clamp may be firmly attached to the end of the torque rod.

The deflection constant for the particular helix is determined by attaching a cotton thread to the projection (provided for that purpose) on the face of the large gear segment, then passed over a detachable pulley and allowed to hang parallel to the torque rod. The dial face on the instrument is set so that it reads zero degrees deflection. A ten-gram weight is attached to the thread and, after tapping the contractometer hanger gently to insure pointer equilibrium, a deflection reading is taken. An additional one-gram weight is attached to the string and a total deflection is obtained. By subtracting the initial (10-gram) deflection from the total deflection, the degrees deflection per ounce may be calculated, if the stress is to be measured in pounds per square inch (p.s.i.). If then the distance on the gear segment from the string to the torque rod is known, the deflection constant can be calculated according to the formula $K=\text{lbs.}/W$ or since lbs.$=\frac{1}{16}$ (1 ounce), $K=\frac{1}{16}W$ where $W=$deflection in degrees/inch. The string, pulley, and weights are of course removed from the contractometer before beginning the plating operation.

All exposed metal parts of the contractometer, other than the helix itself, which will be immersed in the plating bath, must be protected from contact with the plating bath. This is conveniently done using a small brush and the hot platers' stop-off wax. After this operation the face of the helix should again be inspected to insure cleanliness of the surface. Acetone is suitable for removing any excess wax.

The assembly is now immersed up to the height of the electrical contact clamp, in a commercially available proprietary cleaner of the alkaline silicate variety to remove any foreign matter which may have inadvertently been deposited during handling in the previous steps such as contact with the epidermis of the hands. The helix is cathodically cleaned at approximately 5 amps and 120° F. for about one minute. The contractometer is removed from the cleaner, rinsed with cold water, and dipped in a 5% solution of sulfuric acid at room temperature to remove any residual alkali, and without attacking the basis metal, rinsed throughly with water and inserted directly to the plating bath in order to prevent contamination of the now scrupulously clean surface.

In order to insure an even distribution of the electrodeposit, the bath must contain a conforming anode. Electrical contact is made and the system is electrified for ten minutes at 2.5 volts before the actual plating operation is begun to achieve equilibrium of the helix with respect to hydrogen evolution and temperature of the plating bath. The current is turned off and the contractometer dial is zeroed by rotating the dial face. A protective transparent cover (not shown) is placed over the instrument and the plating operation is begun.

Deflection readings are taken at intervals, the frequency of which is dependent upon the rate of deflection obtained. The contractometer hanger is tapped gently just prior to each reading of the deflection in order to insure accuracy and that the mechanical parts are in equilibrium.

When the plating operation is completed, the electrical contact on the contractometer assembly is disconnected, removed from the plating bath, and rinsed with water.

The helix is removed from the assembly, throughly rinsed with water, and immersed in a hot perchloroethylene bath for several minutes to remove the wax coating. The last traces of wax are removed from the helix with a solution of clean acetone, following which the helix is air dried and weighed to the nearest 0.1 mg. By subtracting the original (tare) weight of the helix from the weight after plating, a net weight of the electrodeposit is obtained.

The stress values for each deflection reading (time interval) may now be calculated by the following set of equations:

(1)
$$d \text{ (rate of deposition, in./min.)} = \frac{g}{\frac{G \times 2.543 \times A}{T}}$$

where:

$g=$weight of deposit (grams)
$G=$density of deposit (grams/cm.$^3$)
$A=$total plated area (inches$^2$)
$T=$total plating time (minutes)

(2)
$$Z \text{ (stress factor)} = \frac{2K}{pt}$$

where:

$K=$deflection constant of helix ($K=1/16W$) (in. lb/deg.)
$p=$pitch (width) of helix (inch)
$t=$thickness of helix (inch)

(3)
$$S \text{ (stress, lb./in.}^2\text{)} = Z\frac{D}{d}$$

where:

$D=$observed deflection (degrees/minutes)
$d$ is as in (1) above.

Negative deflection indicates "compressive stress." Positive deflection indicates "tensile stress."

A group of #302 stainless steel helices are plated in a series of differing bath compositions with respect to the amount of chromic acid contained therein at predetermined levels of 20 ounces per gallon, 27 ounces per gallon and 33 ounces per gallon, the $CrO_3/SO_4$ ratio is maintained constant at 100:1, and each bath contains 1.5 grams per liter of colloidal silica, sold commercially under the name of "CAB-O-SIL," the plating being carried out at predetermined current densities of 150 amps./sq. ft., 225 amps./sq. ft., and 275 amps./sq. ft., and at predetermined temperatures of 115° F., 145° F., and 150° F., the temperature of the plating bath being controlled by means of a thermostat and cooling and heating elements.

Chromium plating of the stainless steel helices is carried out by controlling the time during which plating current flows ($t_c$) and the time during which no plating current flows ($t_{nc}$), employing single-phase full-wave rectified current from a 60-cycle alternating current source, and by three-phase half-wave rectified current with one phase reversed, the magnitude of the period of time within which the plating current is flowing, and the period in which no plating current is flowing being determined by calibration of a cathode tube oscilloscope connected to the anode and cathode leads. Since 60-cycle alternating current is used as the source, $t_c+t_{nc}=a$ constant. Commercial rectifiers are used in both instances in conjunction with a step-down transformer and variable resistance, there also being a variable resistance internally of the plating circuit for controlling the cyclically varying periods within predetermined limits. The variables investigated in each set are predetermined by statistical experimental design involving a modified 4-factor, 2-level arrangement initially, the first group constituting a one-half factorial set which is added to as data are accumulated, showing which of the variables will result in the greatest deviation in the stress values.

In each case the plating operation is carried out for each helix at the predetermined conditions for a period of time sufficient to allow for the deposition of approximately 0.5 mil of chromium at which time, in almost all instances, the deflection read on the contractometer approaches a constant value, the deflection values read throughout the total plating time, at predetermined intervals, are translated into stress in terms of pounds per square inch by means of the above formula for each time interval and thickness of the chromium plate at that time, and the resulting values plotted on plain coordinate paper, the stress values being arranged on the "y" axis and the thickness of the chromium plate arranged along the "x" axis.

By arranging the graphs side-by-side, so that the condition of increasing period during which no plating current flows is on a horizontal line, and the increasing temperature is on a vertical line, the general conclusion can be drawn that, as the time during which no plating current flows increases, and the temperature increases, the stress values will decrease. More detailed examination of the stress value curves, however, reveals that better correlation is obtained by taking the stress values at a given thickness of the chromium plate of 0.1 mil. Arbitrarily choosing the 0.1 mil thickness and the corresponding stress value therefor are readily set down in tabular form.

However, because the 0.1 mil thickness is taken arbitrarily, a more random selection of the stress values is obtained by computing the area under the stress value curves, determining the centroid of the area ($\overline{C}$) and drawing a line from the thickness ($x$ axis) through the centroid to the stress curve and reading the stress ($y$ axis) at this point, designated hereinafter as $\overline{x}$.

Tabulating the values obtained for the stress at 0.1 mil, and at the point on the stress curve corresponding to the thickness at the centroid of the area under the curve, gives correlative values of stress in terms of all of the variables investigated over their ranges. Moreover, a multiple regression analysis of the data obtained shows the highest degree of correlation to exist within the temperature variable and the period during which no plating current is flowing. Accordingly, averaging the stress values in terms only of the temperature variable and the period during which no plating current is flowing, may be given in tabular form such as in Tables I and II below.

In this regard, it will be noted that the stress values change in each group, whether single-phase full-wave rectified current, or three-phase half-wave rectified current with one phase reversed is used, as the period during which no plating current flows is increased, and that the stress decreases with increasing temperature but to a lesser degree than is encountered in increasing the period during which no plating current flows. Also, it will be noted that higher stress values are obtained in those instances where the period during which the plating current flows is the greatest, but where there is a period during which no plating current flows, the stress values are always less than the stress values obtained under conditions in which the plating current is continuous, and from the graphs in FIGS. 10 and 11 it will be observed that, for single-phase full-wave rectified current, the values from the table fall on a straight line, as do the points on the curve for three-phase half-wave rectified current with one phase inverted, the latter having a lesser slope than the former. Moreover, it will be noted that the uppermost point on each of the curves (for continuous plating current flowing) results in essentially the same stress value, the "x" axis for these graphs being $t_c$ or period during which plating current flows, for the reason that in the single-phase full-wave rectified current the full cycle is 8.33 seconds, and in the three-phase half-wave rectified current the full cycle is 16.66 milliseconds, which can conveniently be used to represent the continuous current on these curves.

TABLE I.—AVERAGES OF STRESS (S) (P.S.I.×10⁻³) AT $\overline{X}$, I.E., THE STRESS CURVE VALUE AT THE "X" COORDINATE OF THE CENTROID OF THE AREA UNDER THE CURVE

| | | | | | | |
|---|---|---|---|---|---|---|
| $t_c$ | 7.08 | 6.58 | 5.91 | 13.66 | 13.25 | Continuous |
| $t_{nc}$ | 1.25 | 1.75 | 2.42 | 3.00 | 3.41 | 0 |
| Temp., °F.: | | | | | | |
| 115 | 147 | 129 | | 202 | 190 | 224 |
| 145 | | 64 | 56 | 82 | 65.5 | |
| 150 | 104 | 28 | ¹ −16.5 | | | 185 |
| | The spirals were plated using single-phase full-wave rectified current from a 60-cycle (per sec.) alternating current source, resulting in 120 cycles/sec. or 8.33 milliseconds per cycle. | | | The spirals were plated using 3-phase half-wave rectified current, with 1-phase inverted, using a 60-cycle (per sec.) alternating current source resulting in 60 cycles per sec. or 16.66 milliseconds per cycle. | | Both single-phase full-wave rectified current, and 3-phase full-wave rectified current were used from rectifiers designed to give minimum "ripple." |

¹ Compressive.

TABLE II.—AVERAGE OF STRESS (S) (P.S.I.×10⁻³) AT 0.1 MIL OF PLATE THICKNESS

| | | | | | | |
|---|---|---|---|---|---|---|
| $t_c$ | 7.08 | 6.58 | 5.91 | 13.66 | 13.25 | Continuous |
| $t_{nc}$ | 1.25 | 1.75 | 2.42 | 3.00 | 3.41 | 0 |
| Temp., °F.: | | | | | | |
| 115 | 116 | 101 | | 159 | 142 | 188 |
| 145 | 81 | 46 | 24 | 70 | 59.5 | |
| 150 | 40 | ¹ −14.5 | ¹ −32 | | | 144 |

¹ Compressive.

*Example 1A*

Figure 9:
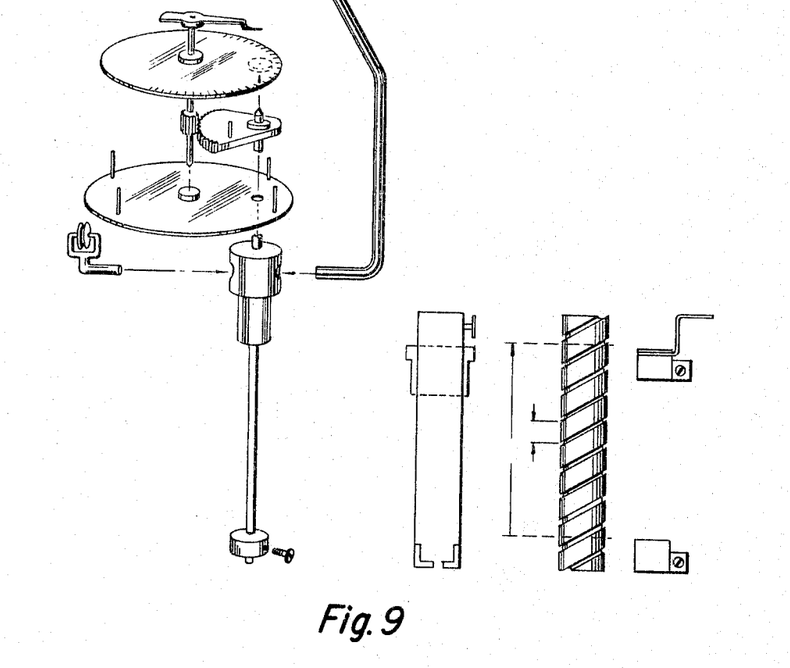
FIG. 9 is a diagrammatic representation of the contractometer used in measuring stress values of chromium plate during the plating process, the view of the apparatus being isometric and in an exploded form.
Figure 9A:
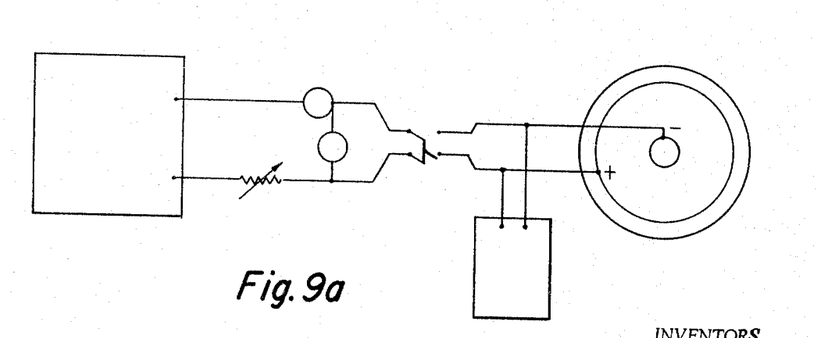
FIG. 9a is a circuit diagram for chromium plating on the helices used in stress measurements obtained with the apparatus of FIG. 9, including the appropriate metering devices, resistance, and oscilloscope connections with the anode and the cathode in the plating baths.

The stress values are measured for helices mounted on the contractometer of FIG. 9 and chromium plated at 130° F., a current density of 150 amps./sq. ft., employing what is regarded in the industry as a "conventional" plating bath containing 27 ozs. of chromic acid per gallon of plating bath, and a chromic acid:sulfate ratio of 100:1, with no other plating bath additives, and in the first instance employing a substantially "ripple-free" direct current voltage, i.e., there is no time during the plating process in which plating current does not flow; and in the second instance, cyclically varying unidirectional current is applied from a single-phase full-wave rectifier, the cycles of current flow being controlled so as to provide in each cycle 1.75 milliseconds during which no plating current is flowing. In the first test the stress at 10⁻⁶×100 is 209×10⁻³, and the stress at "$\overline{X}$" is 235. The stress values obtained when cyclically varying unidirectional current is employed having in the current cycle a period of 1.75 milliseconds during which no plating current flows are 117 at a plate thickness of 100×10⁻⁶, and at "$\overline{x}$" 151.

The desired effect of the process of the present invention is thus demonstrated for a plating bath in which no special bath additives are employed, i.e., the use of cyclically varying unidirectional plating current voltage, in each cycle of which there is an appreciable period during which no plating current flows results in a definite diminution in the stress of the plated metal.

Example 2

The following procedure is used for providing 3003 aluminum alloy with a chromium electroplate that is readily buffed to mirror-like appearance with no evidence of adherence failure or blistering due to the work done by buffing. Buffing the chromium plate is easier than buffing stainless steel.

(1) Buff the aluminum having a mill finish.
(2) Remove buffing compound and grease in a solvent cleaner.
(3) Water rinse.
(4) Spray clean in commercial unit designed for aluminum products.
(5) Spray rinse.
(6) Immerse for 10 minutes at 195° to 200° F. in a solution containing 0.1 g./l. trivalent chromium as chromic sulfate and 0.1 g./l. aluminum as aluminum sulfate in 15% by weight $H_2SO_4$.
(7) Rinse.
(8) Immerse for 10 minutes at 80°±3° F. in a solution containing 12 g./l. sodium dichromate and 51 g./l. sodium bisulfate.
(9) Water rinse.
(10) Water rinse.
(11) Immerse the aluminum part in a chromium plating bath having the following composition:

150 g./l. $CrO_3$ (chromic acid anhydride)
1.5 g./l. $H_2SO_4$ (sulfuric acid)
1.5 g./l. predispersed anhydrous silica at 152°±2° F. for 30 to 60 seconds before applying single-phase full-wave rectified plating current at 300 amps./sq. ft. (2.09 amps./sq. in.) for 7 minutes and thereafter at 200 amps./sq. ft. (1.39 amps./sq. in.) for 15 minutes to produce a minimum thickness of 0.1 mil of chromium; thereafter for an additional 40 minutes to produce a plate thickness of 0.2 mil. and 60 minutes more to produce a plate of 0.3 mil minimum thickness.

(12) Hot water rinse and dry.

The composition of the chromium plating bath for Step 11 is disclosed in MacLean U.S. Patent No. 2,992,171. The excellent quality of the chromium plate therefrom is the result largely of controlling the direct current from single-phase full-wave rectification of 60-cycle alternating current to provide the wave form hereinbefore described after preparation in the conditioning baths.

The high current density for initiating chromium electrodeposition especially is used for providing good adherence on aluminum alloys in the half-hard or harder condition according to the teaching of this invention. Plate distribution is satisfactory.

Salt spray corrosion resistance is good, as shown in the data in Table III.

TABLE III

| Alloy | Minimum Thickness Chromium Plate (mil) | ASTM Committee B8 Rating System. Salt Spray Rating After— | | | |
|---|---|---|---|---|---|
| | | 9 hrs. | 24 hrs. | 33 hrs. | 48 hrs. |
| 3003-0B | 0.1 | 10 | 10 | 9 | 8 |
| 3003-H24B | 0.1 | 10 | 10 | 9 | 9 |
| 3003-0B | 0.2 | 10 | 10 | 9 | 9 |
| 3003-0B | 0.3 | 10 | 10 | 10 | 9 |
| 3003-H14B | 0.3 | 10 | 10 | 10 | 8 |
| 3003-H24B | 0.3 | 10 | 10 | 10 | 10 |

Example 3

The following procedure is used for chromium plating of extrusion-type aluminum alloy represented by 6063 designation and Alcan 50S:

(1) Buff the aluminum.
(2) Solvent and vapor degrease.
(3) Immerse for 5 to 10 minutes at 194° to 198° F. in a solution containing 15% sulfuric acid, 0.1 g./l. aluminum as aluminum sulfate, and 0.1 g./l. trivalent chromium as chromic sulfate.
(4) Water rinse 70°±5° F.
(5) Immerse for 5 to 10 minutes at 80°±5° F. in a solution containing 51 g./l. sodium bisulfate and 12 g./l. sodium dichromate.
(6) Water rinse 70°±5° F.
(7) Chromium plate in a bath containing: 150 g./l. $CrO_3$, 1.5 g./l. sulfuric acid, and 1.5 g./l. anhydrous silica at 147° to 150° F. Direct current density is 216 amps./sq. ft. (1.5 amps./sq. in.) from a single-phase full-wave rectifier (the same effect is obtained from a single phase of a three-phase, half-wave rectifier preset at 12 to 18 volts with a variable resistor in series with the plating tank) for 20 minutes to deposit 0.15 mil of chromium plate.
(8) Hot rinse and dry.

After buffing the 0.15 mil chromium plate, the results of the 5 percent salt spray corrosion test are as shown in Table IV for Alcan 50S extrusions (ASTM Committee B8 rating system):

TABLE IV

| 24 | 48 | 72 | 96 |
|---|---|---|---|
| 9 | 8 | 8 | 7 |
| 9 | 9 | 8 | 8 |
| 10 | 8 | 8 | 8 |
| 9 | 8 | 8 | 8 |

Example 4

The following procedure is used for chromium plating 3003-14H aluminum:

(1) Buff the aluminum.
(2) Clean in alkaline aqueous degreasing solution.
(3) Water rinse 70°±5° F.
(4) Immerse for 5 minutes at 195° F. in a solution containing 15% sulfuric acid, 0.1 g./l. trivalent chromium as chromic sulfate, and 0.1 g./l. aluminum as aluminum sulfate.
(5) Water rinse 70°±5° F.
(6) Immerse for 5 minutes at 80°±2° F. in a solution containing 50 g./l. sodium bisulfate and 12 g./l. sodium dichromate.
(7) Water rinse 70°±5° F.
(8) Immerse in the chromium plating bath containing 20 ozs./gal. $CrO_3$, 0.2 oz./gal. sulfate, 0.2 oz./gal. anhydrous silica, at 145° to 150° F. for 1 minute, thereafter apply single-phase full-wave rectified current for 15 minutes at 216 amps./sq. ft. (1.5 amps./sq. in.); controlling the periods during which plating current flows and the periods during which current does not flow to 6.7 milliseconds and 1.6 milliseconds, respectively, i.e., the voltage and current wave forms shown in FIGS. 1 and 2.
(9) Hot rinse and buff or proceed to Step 10.
(10) Nickel strike plate (conventional).
(11) Bright nickel plate by any one of several proprietary processes in commercial use.
(12) Water rinse.
(13) Chromium plate at 288 amps./sq. ft. (2amps./sq. in.) with current from a motor-driven direct current generator in a 130° F. bath containing 33 ozs./gal. $CrO_3$ and 0.22 oz./gal. sulfate.
(14) Hot rinse and dry.

The chromium plated aluminum is salt spray corrosion tested with the results shown in Table V.

TABLE V

| Plate Thickness (mil) | | | ASTM Committee B8 Rating System Salt Spray Ratings After [1] | | | | | |
|---|---|---|---|---|---|---|---|---|
| Chromium [2] | Nickel | Chromium [3] | 24 | 48 | 72 | 96 | 120 | 144 |
| 0.1 | None | None | 10 | 9.4 | 9.0 | 7.0 | 6.4 | ----- |
| 0.1 | 0.2 | 0.02 | 9.8 | 9.6 | 8.8 | 8.8 | 8.0 | 8.0 |
| 0.1 | 0.6 | 0.025 | 9.8 | 9.8 | 8.8 | 8.8 | 8.4 | 8.0 |

[1] Average of ratings for five panels.
[2] Plated by novel process of present invention.
[3] Chromium plated by high ratio, high-temperature conventional process.

*Example 5*

Table VI shows the corrosion performance when aluminum plated according to the present invention is exposed to copper-acetic acid salt spray test first put into use during 1958.

TABLE VI

| Plate Thickness (mil) | | | Copper Acetic Acid Salt Spray Ratings. after— | |
|---|---|---|---|---|
| Chromium [1] | Nickel | Chromium | 9 hrs. | 18 hrs. |
| 0.12 | 0.6 | 0.025 | 9 | 8 |
| 0.10 | None | None | 7 | ----- |

[1] Applied by the novel process of the present invention.

The plating procedure followed is the same as that outlined above for Example 4, except as follows:

Step 4 is an immersion for 2 minutes in a solution containing 3.7 g./l. of aluminum ion as aluminum sulfate. Step 6 is an immersion for 2 minutes in a solution containing 1 g./l. aluminum ion as aluminum sulfate, and the temperature 107° F.

Other aluminum plated with 0.12 mil chromium, 0.6 mil nickel, 0.025 mil chromium by the procedure of Example 4 shows a rating of 10, 10 and 9, respectively, after 9, 18 and 27 hours of "corrode kote" corrosion test.

In these same accelerated tests, a rating of 8 or better for plated steel and zinc die castings would require 0.4 mil copper plus 0.8 mil nickel plus chromium. The advantages of the plating process of the invention are evident in the achievement of comparable ratings with much less total thickness of plate.

*Example 6*

Figure 17:
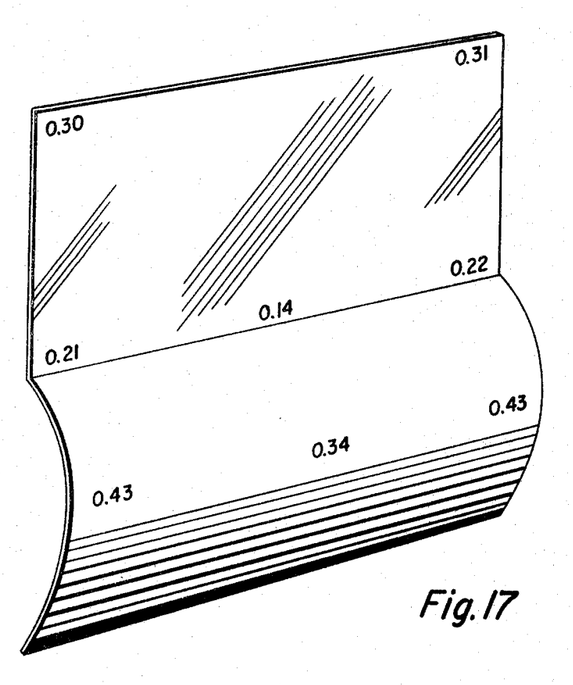
FIG. 17 is a perspective view of the test panel on which chromium plating tests, carried out in accordance with the process of the present invention, are made in order to demonstrate the effectiveness of the process to provide chromium plate on irregular surfaces.

3003 aluminum alloy is chromium plated by the following procedure on multiple racked test panels (12 to 20), shaped like that shown in FIG. 17. The plate thickness is shown in FIG. 17 and uniformity is quite good by chromium plating standards. No evidence of blistering stress cracking or poor adherence of the chromium plate is observed upon inspection. Further, the chromium plate is easier than stainless steel to buff to mirror-like appearance, indicative of the soft low-stress quality of the deposit.

(1) Buff mill finished aluminum.
(2) Solvent degrease.
(3) Water rinse.
(4) Spray wash in commercial unit designed for aluminum products.
(5) Spray rinse.
(6) Immerse 5 minutes in the first conditioning solution of Example 5 at 180° F.
(7) Warm rinse.
(8) Immerse 10 minutes in the second conditioning solution of Example 5 at 85° F.
(9) Water rinse.
(10) Water rinse.
(11) Immerse in the chromium plating of Example 5 at 152°±2° F. for 1 minute. Then apply single-phase full-wave rectified plating current controlled to provide periods during which plating current flows and during which no plating current flows, shown on FIG. 3 at 2.1 amps./sq. in. for 7 minutes, and thereafter at 1.4 amps./sq. in for 15 minutes.
(12) Hot water rinse, dry and buff.

*Example 7*

By using the novel wave forms direct current as shown in FIGS. 2 and 3, decorative, crack-free, non-porous chromium plate can be deposited under conditions heretofore known only to electrodeposit porous and/or cracked chromium. As is known in the art, such cracked or porous decorative chromium over bright nickel on steel, zinc die castings or other basis metals rapidly becomes unsightly because of excessive attack on the nickel plate exposed under the cracks and pores. Heretofore, this undesirable condition has been avoided by electrodepositing 0.025 mil or more of chromium at 300 amps./sq. ft. with a motor-driven direct current, generator, or with a three-phase full-wave rectified 60-cycle current in a 33 to 45 ozs./gal. $CrO_3$ plating bath at $CrO_3$ sulfate ratios of 130/1. to 200/1. This 300 amps./sq. ft. requires heavier bussing and wiring and larger direct current power sources than commonly in use for decorative plating.

By the process of the present invention and plating at 150 amps./sq. ft. at 110°±5° F. in a plating bath containing 20 to 22 ozs./gal. $CrO_3$, with a 130/1. chromic acid/sulfate ratio, and 1.5 grams per liter $SiO_2$, crack-free, non-porous chromium plate of about 0.01 to over 0.1 mil thick is deposited on bright nickel as follows:

(1) Bright nickel plate by conventional methods.
(2) Rinse.
(3) Acid dip in 6N hydrochloric acid.
(4) Rinse.
(5) Chromium plate in the plating of the above composition, by immersing the work in the bath with the applied current controlled to give the wave form of FIGS. 2 and 3, using single-phase full-wave rectified current. Plating time, 5 minutes, at 150 amps./sq. ft. at 114° F. Plate thickness is 0.022 mil at the center of a 4" x 6" panel.

Plating for 20 minutes under these same conditions electrodeposits 0.096 mil of brilliantly clear, crack-free, non-porous chromium plate on the bright nickel.

Furthermore, the chromium plate according to the above procedure is clear, mirror-bright, as well as crack-free and non-porous. Conversely, prior to the advent of the present invention, commercial crack-free, non-porous chromium plate was attainable by plating at twice the above current density, that is, 300 vs. 150 amps./sq. ft., and is not clear bright at thicknesses of 0.02 mil or slightly more, which is needed for outstandingly better corrosion protection over bright nickel.

Thus, with the novel process for obtaining bright low stress chromium plate, conventional chromium plating racks may be used and current values per load are at the level commonly used in the chromium plating industry. The practical advantage of chromium plating at 150 amps./ sq. ft. instead of 300 is obvious to one skilled in the art.

Furthermore, it has been determined that the crack-free, low stress, non-porous, chromium plate over bright nickel has a crystal orientation of (222) and that when such orientation is attained as by the novel process herein described, at temperatures below 120° F., the resultant chromium plate is clear and mirror-bright.

Furthermore, the clear bright chromium plate obtained by the novel process herein described, when deposited on bright nickel, steel or zinc, and heated to 350° F., withstands such heat treatment without developing cracks. This is also a heretofore unavailable quality for chromium plating in the clear bright condition plated at 110° F. and less than 200 amps./sq. ft.

*Example 8*

A high temperature Fe-Cr-Al alloy (70% Fe, 25% Cr and 5% Al) is plated with about 1 mil of chromium using the following procedure:

(1) Descale (vapor blast or grind).
(2) Solvent clean.
(3) Alkaline soak clean.
(4) Water rinse.
(5) Pickle in 8 N $HNO_3$ at 70–80° F. for 2 min.
(6) Water rinse.
(7) Pickle 1.2 N HCl at 70–80° F. to uniform evolution of gas.
(8) Iron strike plate at 70–80° F., in $FeCl_2.4H_2O$ 185 g./l., CHl ($1.19_{sp.\ gr.}$) 80 ml./l. 50 amps./sq. ft. for 6 min.
(9) Water rinse.
(10) Chromium plate to 1.0 mil with:

| | |
|---|---|
| $CrO_3$ | 150 g./l. |
| $H_2SO_4$ | 1.5 g./l. |
| $SiO_2$ | 1.5 g./l. |
| 150° | 2.0 amps./sq. in. strike plate, 1.5 amps./sq. in. for 35 hours. |

The applied current is controlled to give the wave form of FIGS. 2 and 3, using a single-phase full-wave rectified current.

(11) Rinse and dry.

The chromium plated alloy is then heated in a Bunsen burner flame to about 1200° F. (dull red on the color scale), and quenched in water, and then heated again to about 2100° F. (yellow on the color scale), for 3 hours with no evidence of spalling or flaking of the plate. The hardness of the chromium after heating is 230 on the Knoop hardness scale for micro thicknesses of metals. The chromium plated alloy is then bent back on itself (180°) and is cut with a band saw with no evidence of flaking of the plate.

*Example 9*

Figure 10:
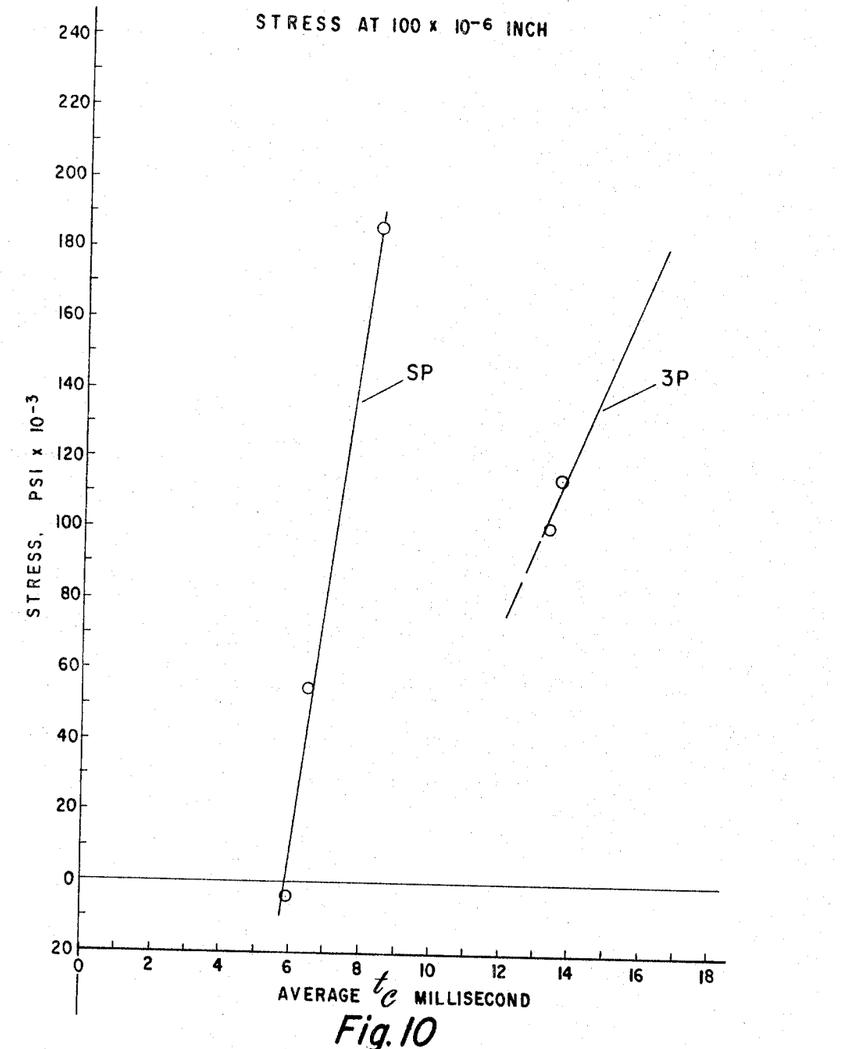
FIG. 10 is a graphic representation of a curve of the stress values obtained with the contractometer of FIG. 9, and the plating operation carried out using the circuit diagram of FIG. 9a, plotted against the time during which the cyclically varying unidirectional current ($t_c$) flows in each cycle, for both single-phase and three-phase currents, the stress values being measured at a plate thickness of $100 \times 10^{-6}$ inch.
Figure 11:
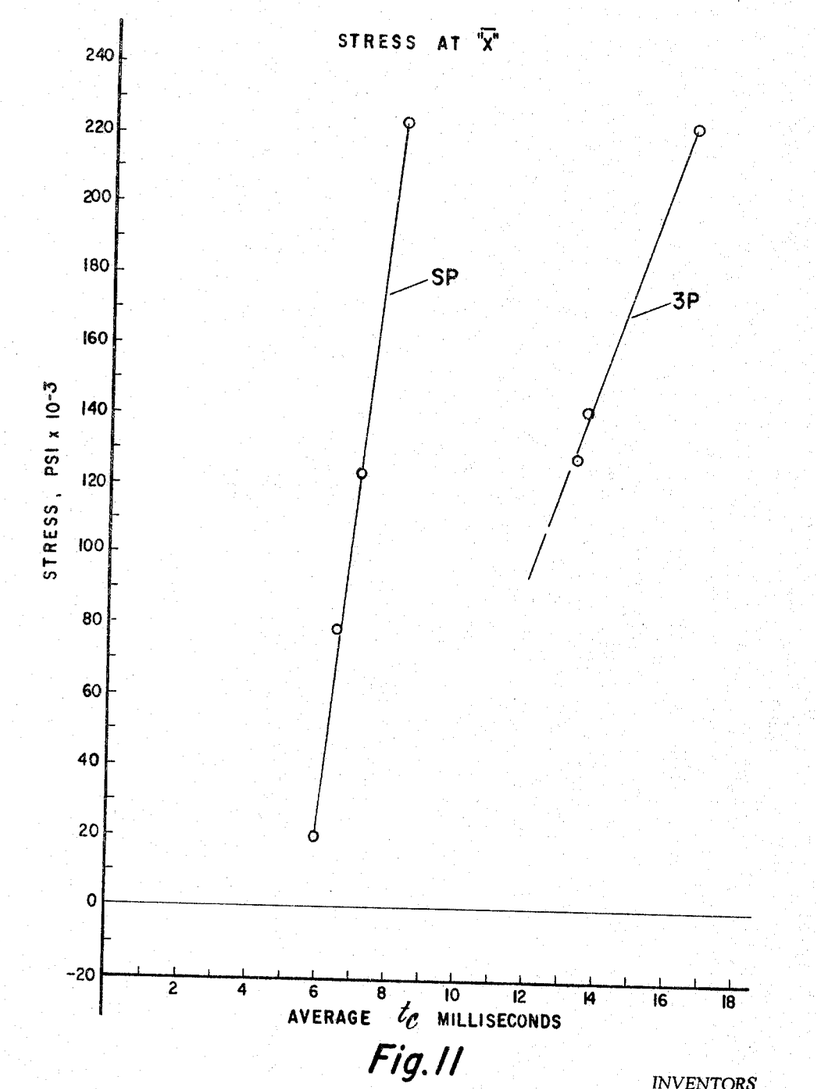
FIG. 11 is a graphic representation similar to that of FIG. 10, except that the stress values are measured at "$\bar{x}$," or the stress value determined by a line from the "$x$" axis vertically through the centroid of the area under the stress curve, to the stress curve, both for single-phase full-wave rectified current, and for three-phase half-wave rectified current with one phase reversed as shown in FIGS. 7 and 8.

70–30 brass is cleaned by conventional means and plated with the cyclically varying current wave form of FIG. 10 in a bath containing:

22 ozs. $CrO_3$/gal.
130/l., $CrO_3/SO_4$ ratio
0.2 ozs. $SiO_2$/gal.
Temp. 145° F.
1.5 amps./sq. in. for 45 min.—immerse in plating bath with cyclically varying current on for a time to plate a thickness of about 0.30 mil.

The plate is found to be non-porous, crack-free, and soft, as evidenced by buffing to a lustrous finish. CASS test for 18 hours has an ASTM rating of 10.

*Example 10*

NAX steel is cleaned by conventional means and plated in the plating bath of the foregoing Example 9 as follows:

Immerse for 15 seconds without applied plating current and thereafter plate at 1.5 amps./sq. in. with the cyclically varying current wave form of FIG. 10 for 45 minutes to plate 0.28 mil.

The plate is found to be non-porous, crack-free, and is readily buffed to a lustrous finish evidencing its relative softness. CASS test for 18 hours has an ASTM rating of 8.

*Example 11*

4340 steel is plated in the bath of Example 9 as follows:

Immerse for 15 seconds without applied plating current and thereafter plate at 1.5 amps/sq. in. with the cyclically varying current wave form of FIG. 10 for 2½ hours. The plate is found to be non-porous and crack-free so as to be suitable for engineering applications.

*Example 12*

Computing the constants from the above formula:

$$t(\text{max. in millisecs.}) = \frac{11.5}{(CD) \times (CE)}$$

and for $CD = 1.04$; 1.56; and 1.91, amps./sq. in.

$$t(\text{max.}) = \frac{11.1}{(CE)};\ \frac{7.4}{(CE)};\ \text{and}\ \frac{6.0}{(CE)},\ \text{respectively}$$

In the experiments performed for the stress value obtained in Example 1 it is found that in most instances bath composition, in terms of $CrO_3$ concentration, affects (CE) by only 1–2%, in the range from 20 to 33 ozs./gal., where CE is computed from the amount of Cr deposited during the sum of periods in which plating current flows, that the length of the periods in which plating current is not flowing has less effect on (CE) than bath composition, and that temperature has the greatest effect on (CE) in the range of 115° F. to 150° F., i.e., about 3% as would be expected. In these same experiments it is found that the averages of the (CE) values vary with temperature, decreasing from 12.2 to 9.7 as temperature increases from 115° F. to 145° F., and the corresponding averages of the stress values follow the same general pattern noted in Example 1 for variation with the length of the periods during which the plating current does not flow and with temperature.

The $t$ (max.) in milliseconds from the above formulae are tabulated below in Table VII for the current densities (CD) and current efficiencies (CE) of the experiments of Example 1:

TABLE VII

| (CE) | (CD) (amps./sq. in.) | | |
|---|---|---|---|
| | 1.04 | 1.56 | 1.91 |
| 0.12 | 92 | 62 | 50 |
| .11 | 101 | 67 | 55 |
| .10 | 111 | 74 | 60 |
| .09 | 123 | 82 | 67 |

Relationship of the stress values at "$\bar{x}$" to (CD), (CE), plating bath temperature, and the ratio of the time during which the plating current flows ($t_c$) to the maximum time ($t_{max.}$), permitted by the above formula, is shown by the following typical results shown in Table VIII.

TABLE VIII

| T.° F. | (CD) | (CE) | $t_c/t$ (max.) | $t_o$ | S. at "$\bar{x}$" $\times 10^{-3}$ |
|---|---|---|---|---|---|
| 145 | 1.04 | 0.10 | 0.11 | [1] 13.16 | 58 |
| 145 | 1.56 | 0.09 | 0.20 | [1] 13.33 | 73 |
| 145 | 1.91 | 0.11 | 0.27 | [1] 13.66 | 82 |
| 145 | 1.04 | 0.11 | 0.07 | [2] 7.08 | 135 |
| 145 | 1.04 | 0.095 | 0.08 | [2] 6.50 | 112 |
| 145 | 1.04 | 0.09 | 0.05 | [2] 5.91 | 60 |

[1] 3-phase. 60-cycle current. full-wave rectified. 1-phase reversed.
[2] Single-phase full-wave rectified current.

These results are to be interpreted as showing trends, since other factors, such as bath additives, surface treatment and the like, can act to affect these results in a positive or negative direction.

Also, noteworthy in this regard in the results obtained in the experiments of Example 1 is the fact that where the ratio $t_c:t_{max.}$ is at the minimum encountered and at a plating bath temperature of 150° F., the values for S. at "$\bar{x}$" represent the lowest values attained, as follows in Table IX.

TABLE IX

| T. ° F. | (CD) | (CE) | $t_c/t_{max.}$ | $t_o$ | S. at "$\bar{x}$" ×10⁻³ |
|---|---|---|---|---|---|
| 150 | 1.04 | 0.09 | 0.05 | 5.91 | −16 |
| 150 | 1.04 | 0.07 | 0.04 | 6.50 | 28 |

Again these results are to be interpreted as showing a general indication of what may be accomplished by the method of the present invention, taking into acount that other factors, as noted above, can act to affect these results.

It is to be understood that although the invention has been described with specific reference to particular embodiments thereof, it is not to be so limited, since changes and alterations therein may be made which are within the full intended scope of this invention as defined by the appended claims.

What is claimed is:
1. In the method of producing a chromium plate of low internal stress by electrodepositing chromium on a basis metal constituting the cathode in an electric circuit having an anode and a cathode immersed in an aqueous solution maintained at a temperature within the range of about 105° F., to about 150° F., and containing chromic acid together with anions and cations for promoting the electrodeposition of chromium, the improvement which includes:
   1. applying to said anode and cathode a cyclically varying unidirectional voltage,
   2. controlling said voltage in such a manner that there is within each cycle of the voltage variations,
      (a) a period ($t_1$) of current density of sufficient magnitude and duration to deposit $CrH_x$, but less than one half that required to deposit a monomolecular layer of $CrH_x$, at the cathode surface,
      (b) and a shorter succeeding finite period ($t_2$) in which the current comes to and remains at zero whereby depositing of $CrH_x$ ceases,
      (c) the duration of the succeeding period ($t_2$) being greater than 0.5 millisecond and sufficient to allow decomposition of deposited $CrH_x$ and coincident deposition of chromium metal, but insufficient to allow substantial diffusion of the bulk of said solution into the cathode film,
3. and simultaneously blocking the flow of current produced by the system including said anode and cathode in said solution during said succeeding period ($t_2$), whereby a substantial portion of the cathode film is retained.

2. The method of claim 1 wherein the period ($t_1$) is substantially within the range of 0.05 to 0.35 of the time required to deposit a monomolecular layer of $CrH_x$.

3. The method of claim 2 wherein the applied cyclically varying unidirectional voltage has from 50 to 120 cycles per second and is attained by rectifying alternating current.

4. The method of claim 3 wherein the internal stress of the electrodeposited chromium is controlled by adjusting the product of the current density times the current efficiency so that the ratio of the periods ($t_2$):($t_1$) is not substantially less than 1.25:7.08.

References Cited by the Examiner

UNITED STATES PATENTS

| | | | |
|---|---|---|---|
| 1,918,605 | 7/1933 | Jones | 204—51 |
| 2,392,871 | 1/1946 | Wick | 204—51 |
| 2,517,441 | 8/1950 | Raab | 204—51 |
| 2,678,299 | 5/1954 | Geese et al. | 204—51 X |
| 3,042,592 | 7/1962 | Schaer | 204—51 |

OTHER REFERENCES

Richards, V. L., "Voltage and Current Fluctuations in the Output of Plating Rectifiers," 41st Annual Proceedings of the American Electroplaters Society, pp. 107–115, 1945.

JOHN H. MACK, *Primary Examiner.*

G. KAPLAN, *Assistant Examiner.*